United States Patent
Shatters et al.

(10) Patent No.: US 9,938,692 B2
(45) Date of Patent: Apr. 10, 2018

(54) WHEEL LOADER PAYLOAD MEASUREMENT SYSTEM LINKAGE ACCELERATION COMPENSATION

(71) Applicant: Caterpillar Inc., Peoria, IL (US)

(72) Inventors: Aaron R. Shatters, Montgomery, IL (US); Eric W. Cler, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 158 days.

(21) Appl. No.: 14/986,843

(22) Filed: Jan. 4, 2016

(65) Prior Publication Data

US 2017/0191245 A1  Jul. 6, 2017

(51) Int. Cl.
| | |
|---|---|
| *G01G 19/08* | (2006.01) |
| *E02F 9/26* | (2006.01) |
| *E02F 3/28* | (2006.01) |
| *E02F 3/42* | (2006.01) |
| *E02F 9/22* | (2006.01) |

(52) U.S. Cl.
CPC ............... *E02F 9/26* (2013.01); *E02F 3/283* (2013.01); *E02F 3/422* (2013.01); *E02F 9/2203* (2013.01); *G01G 19/083* (2013.01)

(58) Field of Classification Search
CPC .... G01G 19/08; G01G 19/083; G01G 19/086; G01G 19/10
See application file for complete search history.

(56) References Cited

U.S. PATENT DOCUMENTS

| | | | | |
|---|---|---|---|---|
| 4,677,579 A | * | 6/1987 | Radomilovich | E02F 9/26 177/147 |
| 4,809,794 A | * | 3/1989 | Blair | E02F 3/30 177/139 |
| 5,167,287 A | * | 12/1992 | Pomies | G01G 19/10 177/1 |
| 5,461,803 A | * | 10/1995 | Rocke | E02F 3/437 37/443 |
| 5,509,293 A | * | 4/1996 | Karumanchi | G01G 23/01 177/139 |
| 5,837,945 A | * | 11/1998 | Cornwell | B65F 3/04 177/136 |
| 6,211,471 B1 | * | 4/2001 | Rocke | G01G 19/083 177/136 |

(Continued)

FOREIGN PATENT DOCUMENTS

| | | |
|---|---|---|
| DE | 102009051210 A1 | 5/2011 |
| EP | 0129422 A2 | 12/1984 |

(Continued)

*Primary Examiner* — Natalie Huls
(74) *Attorney, Agent, or Firm* — Miller, Matthias & Hull; Derek J. Somogy

(57) ABSTRACT

A payload weight of a load of material carried by an implement of a machine may be estimated taking into account angular acceleration of the payload. A lift cylinder pressure differential and a lift arm angular acceleration may be determined as the implement is raised through a weigh range. An angular acceleration compensation factor may be determined from the lift arm angular acceleration, and a compensated differential pressure may be calculated by multiplying the lift cylinder pressure differential by the angular acceleration compensation factor. The estimated payload weight may then be determined based on the compensated pressure differential and a head end cross-sectional area of the lift cylinder.

17 Claims, 4 Drawing Sheets

(56) References Cited

U.S. PATENT DOCUMENTS

| | | | |
|---|---|---|---|
| 6,518,519 B1 | 2/2003 | Crane, III et al. | |
| 7,912,612 B2 | 3/2011 | Janardhan et al. | |
| 9,091,586 B2* | 7/2015 | Hague | G01G 19/10 |
| 9,200,432 B1* | 12/2015 | Shatters | G01G 19/083 |
| 2006/0100808 A1* | 5/2006 | Lueschow | G01G 19/10 |
| | | | 702/101 |
| 2008/0169131 A1 | 7/2008 | Takeda et al. | |
| 2014/0167971 A1* | 6/2014 | Stanley | E02F 9/264 |
| | | | 340/666 |
| 2015/0354177 A1* | 12/2015 | Shatters | E02F 3/422 |
| | | | 414/21 |

FOREIGN PATENT DOCUMENTS

| | | |
|---|---|---|
| JP | S61277022 A | 12/1986 |
| WO | WO-2006/098645 A1 | 9/2006 |

* cited by examiner

WHEEL LOADER PAYLOAD MEASUREMENT SYSTEM LINKAGE ACCELERATION COMPENSATION

TECHNICAL FIELD

The present disclosure relates generally to a payload measurement system and, more particularly, to a payload measurement system that compensates for acceleration of a linkage raising a work implement carrying the payload.

BACKGROUND

Various types of machines may use a work implement to transfer material from a work site and load the material onto transport vehicles (e.g., dump trucks, railroad cars and the like). These machines include excavators, wheel loaders, backhoes and other material moving machines. The transport vehicles loaded by the machines may have a particular load capacity determined by a manufacturer's maximum load rating and/or other factors, such as, for example, weight restrictions for on-highway vehicles. To promote maximum utilization of the transport vehicles, it may be desirable to load each transport vehicle as close as possible to its load capacity. Overloading the transport vehicle, however, may have negative consequences. Particularly, placing too much weight on a transport vehicle can significantly increase maintenance costs for the transport vehicle or create costly delays if the excess material is removed prior to transport. Under loading the transport vehicle may also be undesirable if it creates inefficiencies due to added delays and expense required to make additional trips of the transport vehicles to move material around and to remove the material from the work site.

To monitor the weight of the material placed onto each transport vehicle, machine manufacturers have developed payload calculation systems. A payload calculation system may determine the weight of a material currently carried by the work implement (e.g., weight of material in an excavator bucket), as well as the total weight of a material loaded onto a transport vehicle during a particular cycle or time period. For improved productivity, the payload calculation system may determine the weight of a material carried by the machine and/or work implement while the machine and/or work implement is in motion rather than performing static measurements where static friction and other forces may influence the accuracy of the weight measurement.

One method for determining the weight of material in a work implement is disclosed in U.S. Pat. Appl. Publ. No. 2008/0169131 by Takeda et al. published on Jul. 17, 2008, entitled "Device and Method for Measuring Load Weight on Working Machine." The Takeda et al. publication discloses a method for measuring the weight of a load accurately in a working machine for moving a load of material such as a wheel loader. While the load of material is lifted by a boom of the working machine, a boom angle and a pressure value of a boom cylinder are measured and a boom angular speed is calculated. A corrected factor is determined according to the boom angular speed, and a corrected pressure value is calculated based on the measure pressure value, the boom angular speed and the corrected factor. A predetermined table is referred to and the weight of the load is determined based on the boom angle and the corrected pressure value of the boom cylinder.

Although the corrected factor of the Takeda et al. publication may compensate for frictional effects of the movement of the boom of the working machine, other factors may exist that affect the accuracy of determining the weight of a load of material.

SUMMARY OF THE DISCLOSURE

In one aspect of the present disclosure, a machine is disclosed. The machine may include an end frame, a lift arm pivotally connected to the end frame and having a lift arm angle that is equal to an angle between a horizontal line and a lift arm longitudinal axis, an implement pivotally connected to the lift arm, and a lift cylinder having a lift cylinder head end pivotally connected to the end frame and a lift cylinder rod end pivotally connected to the lift arm. The machine may also include a lift cylinder actuator operatively coupled to the lift cylinder to provide pressurized fluid flow to the lift cylinder to cause the lift cylinder to extend and retract to correspondingly cause the lift arm to rotate to raise and lower the implement, a control lever position sensor operatively connected to a control lever to sense a displacement of the control lever and output a control lever position sensor signal that corresponds to the displacement of the control lever, a lift arm angle sensor operatively connected to the lift arm to sense the lift arm angle of the lift arm and output a lift arm angle sensor signal that corresponds to the lift arm angle, a head end pressure sensor operatively connected to the lift cylinder to sense a head end pressure of the lift cylinder and output a head end pressure sensor signal that corresponds to the head end pressure, a display device, and a controller operatively connected to the lift cylinder actuator, the control lever position sensor, the lift arm angle sensor, the head end pressure sensor, and the display device. The controller may be configured to detect the control lever position sensor signal and to transmit a lift cylinder control signal to cause the lift cylinder actuator to create fluid flow to cause the lift cylinder to extend in response to receiving the control lever position sensor signal, to determine a lift cylinder pressure differential based on the head end pressure from the head end pressure sensor signal in response to determining that the lift arm angle in the lift arm angle sensor signal is within a weigh range of the lift arm, and to determine a lift arm angular acceleration in response to determining that the lift arm angle in the lift arm angle sensor signal is within the weigh range of the lift arm. The controller may further be configured to determine an angular acceleration compensation factor based on the lift arm angular acceleration, to determine a compensated pressure differential by multiplying the lift cylinder pressure differential by the angular acceleration compensation factor, to determine a payload weight of a load of material in the implement based on the compensated pressure differential and a head end cross-sectional area of the lift cylinder, and to transmit payload weight signals to the display device to display the payload weight to an operator of the machine.

In another aspect of the present disclosure, a method for determining a payload weight of a load of material carried by an implement of a machine is disclosed. The method may include raising the implement through a weigh range between a lower lift limit and an upper lift limit of the implement, determining, at a controller of the machine, a lift cylinder pressure differential in a lift cylinder of the machine based on a head end pressure of the lift cylinder, and determining, at the controller, a lift arm angular acceleration of a lift arm of the machine raising the implement through the weigh range. The method may further include determining, at the controller, an angular acceleration compensation factor based on the lift arm angular acceleration, determining, at the controller, a compensated pressure differential by multiplying the lift cylinder pressure differential by the angular acceleration compensation factor, and determining, at the controller, the payload weight of the load of material based on the compensated pressure differential and a head end cross-sectional area of the lift cylinder.

In a further aspect of the present disclosure, a payload weight calculation system for determining a payload weight of a load of material carried by an implement of a machine is disclosed. The payload weight calculation system may include a lift arm angle sensor configured to sense a lift arm angle of a lift arm of the machine and output a lift arm angle sensor signal that corresponds to the lift arm angle, a head end pressure sensor configured to sense a head end pressure of a lift cylinder connected to the lift arm and output a head end pressure sensor signal that corresponds to the head end pressure, and a controller. The controller may be configured to determine a lift cylinder pressure differential based on the head end pressure from the head end pressure sensor signal in response to the lift arm rotating upwardly and determining that the lift arm angle in the lift arm angle sensor signal is within a weigh range of the lift arm, to determine a lift arm angular acceleration in response to determining that the lift arm angle in the lift arm angle sensor signal is within the weigh range of the lift arm, to determine an angular acceleration compensation factor based on the lift arm angular acceleration, to determine a compensated pressure differential by multiplying the lift cylinder pressure differential by the angular acceleration compensation factor, and to determine the payload weight of the load of material in the implement based on the compensated pressure differential and a head end cross-sectional area of the lift cylinder.

Additional aspects are defined by the claims of this patent.

DETAILED DESCRIPTION

Figure 1:
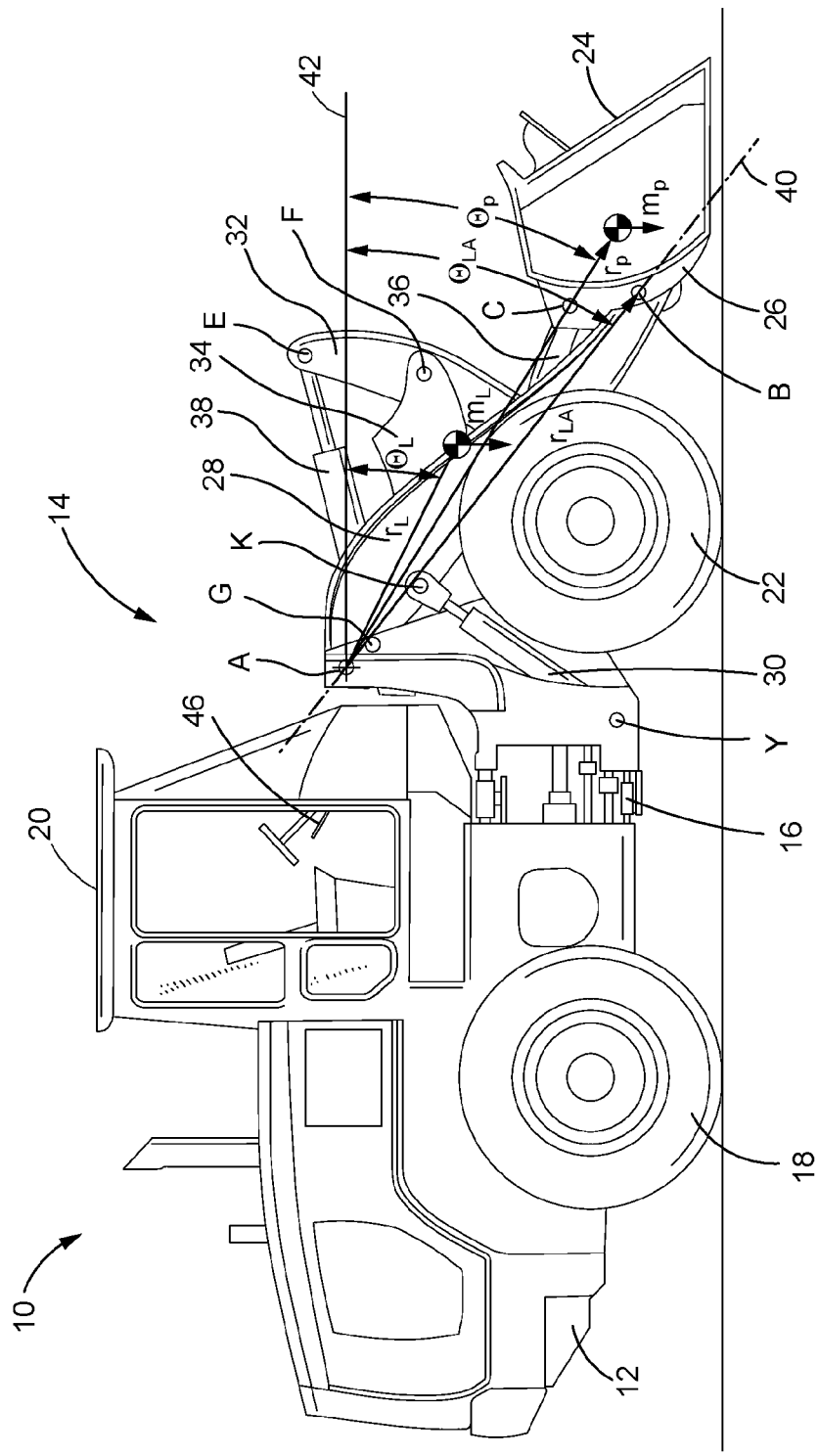
FIG. 1 is a side elevation view of a wheel loader machine in which payload measurement with acceleration compensation in accordance with the present disclosure may be implemented.

FIG. 1 illustrates an embodiment of a wheel loader machine 10 in which a payload measurement system in accordance with the present disclosure may be implemented. The wheel loader machine 10 includes a body portion 12 and a non-engine end frame 14 connected by an articulating joint 16. The body portion 12 houses an engine (not shown) that drives rear wheels 18, and includes an elevated cab 20 for the operator. The end frame 14 has front wheels 22 that are turned by a steering mechanism (not shown), with the articulating joint 16 allowing the end frame 14 to move from side-to-side to turn the wheel loader machine 10. In the illustrated embodiment, an implement 24 in the form of a bucket is mounted at the front of the end frame 14 on a coupler 26. The implement 24 and the coupler 26 may be configured for secure attachment of the implement 24 during use of the wheel loader machine 10, and for release of the bucket 24 and substitution of another implement. Although the coupler 26 and the implement 24 are illustrated and described as being separate connectable components, those skilled in the art will understand that each implement, including buckets, may be configured as a unitary component having a material engaging portion, such as the bucket, forks, clamps and the like, and a coupling portion having the points of attachment for connecting the implement to the machine 10.

The coupler 26 is connected to the end frame 14 by a pair of lift arms 28. One end of each lift arm 28 is pivotally connected to the end frame 14 and the other end is pivotally connected to the coupler 26 proximate the bottom. The lift arms 28 rotate about the point of connection to the end frame 14, with the rotation of the lift arms 28 being controlled by corresponding lift cylinders 30 pivotally coupled to the end frame 14 at a head end of the lift cylinders 30 and at the lift arms 28 at a rod end of the lift cylinders 30. The lift cylinders 30 may be extended by adding pressurized fluid to the head end and draining fluid from the rod end to raise the lift arms 28, and retracted by adding fluid to the rod end and draining pressurized fluid from the head end to lower the lift arms 28. In typical implementations, two lift arms 28 are provided, with each having a corresponding lift cylinder 30. However, a single lift arm 28 and lift cylinder 30, two lift arms 28 driven by a single lift cylinder 30, or other arrangements of lift arms 28 and lift cylinders 30 providing similar functionality as kinematic elements may be implemented.

The rotation of the coupler 26 and attached implement may be controlled by a Z-bar linkage of the end frame 14. The Z-bar linkage may include a tilt lever 32 pivotally connected to a tilt lever support 34 mounted on the lift arms 28 such that the tilt lever support 34 moves with the lift arms 28. At one end of the tilt lever 32, a tilt link 36 has one end pivotally connected to the end of the tilt lever 32, and the opposite end pivotally connected to the coupler 26 proximate the top. A tilt cylinder 38 couples the opposite end of the tilt lever 32 to the end frame 14 with pivotal connections at either end. For a given position of the lift arms 28, the coupler 26 and implement are rotated toward the racked position by extending the tilt cylinder 38, and rotated in the opposite direction toward the dump position by retracting the tilt cylinder 38.

Each of the connections between the elements that move with respect to one another is made by a pivot pin about which the elements rotate. Consequently, the lift arms 28 may be connected to the end frame 14 by pivot pins A and to the coupler 26 by pivot pins B. The tilt link 36 may be connected to the coupler 26 by a pivot pin C and to the tilt lever 32 by a pivot pin D. The tilt lever 32 may be connected to the tilt cylinder 38 by a pivot pin E and to the tilt lever support 34 by a pivot pin F. The opposite end of the tilt cylinder 38 may be connected to the end frame 14 by a pivot pin G. Finally, a lift cylinder rod end of the lift cylinders 30 may be connected to the lift arms 28 by pivot pins K and a lift cylinder head end of the lift cylinders 30 may be connected to the end frame 14 by pivot pins Y. Because the pivot pins A, G, Y are attached to the end frame 14, the distance between the pivot pins A, G, Y if fixed.

FIG. 1 further illustrates several parameters of the machine 10 that may be relevant to the determination of an estimated payload weight for a load of material carried by the implement 24. The lift arms 28 may have a lift arm longitudinal axis 40 that may pass through the pivot pin A and the pivot pin B, and may have a lift arm length $r_{LA}$ equal to a distance from the pivot pin A to the pivot pin B. The lift arm longitudinal axis 40 may have a lift arm angle $\theta_{LA}$ that is equal to an angle between the lift arm longitudinal axis 40 and a horizontal line 42. The lift arm longitudinal axis 40, the lift arm length $r_{LA}$ and the lift arm angle $\theta_{LA}$ provide a kinematic representation of the lift arm 28 that may be used in determining the estimated payload weight.

The coupler 26, the lift arms 28 and the elements of the Z-bar linkage (the tilt lever 32, the tilt lever support 34, the tilt link 36 and the tilt cylinder 38) may be collectively referred to as a lift linkage 44. The lift linkage 44 may have a lift linkage center of mass $m_L$ that is derived from the centers of mass of the individual components. The lift linkage center of mass $m_L$ may be located at a linkage distance $r_L$ from the pivot pin A, and may have a linkage angle $\theta_L$ that is equal to an angle between a line drawn through the lift linkage center of mass $m_L$ and the pivot pin A, and the horizontal line 42. The lift linkage center of mass $m_L$ creates a moment about the pivot pin A that is transmitted to the lift cylinder 30 by the connection to the lift arms 28 and increases a head end pressure $p_{HE}$ in the lift cylinder 30 that must be accounted for when estimating the weight of a payload carried by the implement 24. While the position of the lift linkage center of mass $m_L$ may vary as the Z-bar linkage moves to rotate the implement 24 about the pivot pin B, the position will be consistent during the weighing operation where the implement 24 will be fully racked back as will be discussed below.

The mass and position of the implement 24 and the load of material accumulated therein also factor into the payload weight estimate. The implement 24 and the load of material will have a payload center of mass $m_P$ that is an accumulation of their individual centers of mass. The payload center of mass $m_P$ may be located at a payload distance $r_P$ from the pivot pin A, and may have a payload angle $\theta_P$ that is equal to an angle between a line drawn through the payload center of mass $m_P$ and the pivot pin A, and the horizontal line 42. The payload center of mass $m_P$ also creates a moment about the pivot pin A that is transmitted to the lift cylinder 30 and increases the head end pressure $p_{HE}$ in the lift cylinder 30, and the weight of the implement 24 will be taken into account when estimating the weight of a payload carried therein. The position of the payload center of mass $m_P$ will be generally consistent, but will vary somewhat during the weighing operation due to variations in the amount and disposition of the load within the implement 24, but such variations will not significantly impact weight estimates derived from the methods in accordance with the present disclosure set forth hereinafter.

Figure 2:
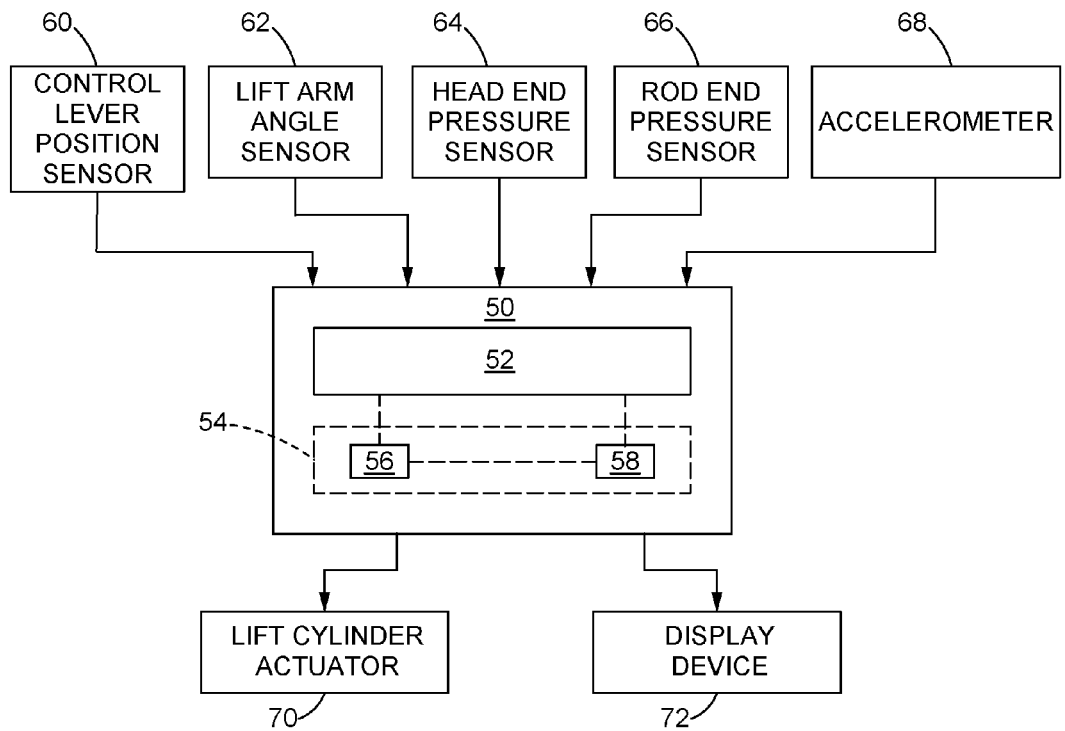
FIG. 2 is a schematic view of electrical components of the wheel loader machine of FIG. 1.

Referring now to FIG. 2, the machine 10 may include various control components utilized in estimating the payload weight. The machine 10 may include a controller 50 capable of receiving information in signals from control devices, sensors and other input devices, processing the received information using software stored therein, and outputting information to output devices such as actuators and displays that cause the machine 10 to operate and provide information to an operator of the machine 10. The controller 50 may include a microprocessor 52 for executing a specified program, which controls and monitors various functions associated with the machine 10. The microprocessor 52 includes a memory 54, such as read only memory (ROM) 56, for storing a program, and a random access memory (RAM) 58 which serves as a working memory area for use in executing the program stored in the memory 54. Although the microprocessor 52 is shown, it is also possible and contemplated to use other electronic components such as a microcontroller, an ASIC (application specific integrated circuit) chip, or any other integrated circuit device.

The controller 50 electrically connects to the control elements of the machine 10, as well as various input devices for commanding the operation of the machine 10 and monitoring the performance of the machine 10. As a result, the controller 50 may be electrically connected to input devices detecting operator input and providing control signals to the controller 50 that may include a control lever position sensor 60. The control lever position sensor 60 may be operatively connected to a control lever 46 (FIG. 1) within the cab 20 and may sense a displacement of the control lever 46 indicative of an operator's intent to have the lift arms 28 and the implement raised or lowered. The control lever position sensor 60 may respond by outputting a control lever position sensor signal that corresponds to the displacement of the control lever 46. The greater the displacement of the control lever 46 from a neutral position, the faster the operator desires to have the lift arms 28 move in the commanded direction. A value transmitted in the control lever position sensor signal will correspond to the direction and magnitude of the displacement of the control lever 46, and the controller 50 may be configured to interpret the control lever position sensor signal.

The controller 50 may also be connected to sensing devices providing control signals with values indicating real-time operating conditions of the machine 10, such as a lift arm angle sensor 62, a head end pressure sensor 64, a rod end pressure sensor 66 and an accelerometer 68. The lift arm angle sensor 62 may be a rotary encoder, shaft encoder or other appropriate device for converting an angular position of an element into an analog or digital signal. The lift arm angle sensor 62 may be operatively connected to the lift arms 28 to sense the lift arm angle $\theta_{LA}$ of the lift arms 28 and may output a lift arm angle sensor signal to the controller 50 that corresponds to the lift arm angle $\theta_{LA}$.

The head end pressure sensor 64 and the rod end pressure sensor 66 may be appropriate pressure sensing devices or transducers as are known in the art for sensing pressures and generating corresponding head end pressure sensor signals and rod end pressure sensing signals corresponding to the sensed pressures. The head end pressure sensor 64 may be operatively connected to the lift cylinder 30 in fluid communication with the head end of the lift cylinder 30. The head end pressure sensor 64 may be positioned and installed to read the pressure in the head end directly, or may be installed along a fluid conduit having a pressure equal to the head end pressure $p_{HE}$, or a pressure that is proportionate to the head end pressure $p_{HE}$ such that the controller 50 may determine the head end pressure $p_{HE}$ when the head end pressure sensor signal is received. The rod end pressure sensor 66 may be similarly positioned with respect to the rod end of the lift cylinder 30 so that the rod end pressure sensor signal may be received by the controller 50 and converted into the rod end pressure $p_{RE}$. However, some machines 10 may not include the rod end pressure sensor 66. In such implementations, the controller 50 may be configured to determine an estimated payload weight using only an actual value for the head end pressure $p_{HE}$ as will be discussed more fully below.

In some implementations, the machine 10 may be configured to directly measure a lift arm angular acceleration $\alpha$ of the lift arms 28 for use in compensating for forces caused by the lift arm angular acceleration α that have an effect on estimating the payload weight. In such implementations, the machine 10 may including the accelerometer 68 of a type commonly known in the art operatively connected to the lift arms 28 to sense the lift arm angular acceleration α as the lift arms 28 rotate. In response to rotation of the lift arms 28, the accelerometer 68 may output an accelerometer signal having a value that corresponds to the magnitude and direction of the lift arm angular acceleration α. The controller 50 may be configured to receiving the accelerometer signal from the accelerometer 68 and determine the lift arm angular acceleration α based on magnitude or value of the accelerometer signal. Where the accelerometer 68 is not provided, the controller 50 may determine the lift arm angular acceleration α from other information as discussed further below.

The controller 50 may also be electrically connected to output devices to which control signals are transmitted and from which control signals may be received by the controller 50, such as, for example, a lift cylinder actuator 70 and a display device 72. The lift cylinder actuator 70 may be operatively coupled to the lift cylinder 30 to cause pressurized fluid flow to the lift cylinder 30 causing the lift cylinder 30 to extend and retract to correspondingly rotate the lift arms 28 to raise and lower the implement 24. The lift cylinder actuator 70 may be a solenoid or other type of actuator to which the controller 50 may output lift cylinder control signals or solenoid current to move a corresponding valve element (not shown) to positions to create fluid flow to the lift cylinder 30 corresponding to the control lever position sensor signals received by the controller 50 from the control lever position sensor 60. The values of the lift cylinder control signals may be based on a commanded fluid flow $C_{lift}$ determined by the controller 50 from the control lever position sensor signals to cause the lift cylinder actuator 70 to rotate the lift arms 28 in the direction and at the speed commanded by the operator at the control lever 46.

The display device 72 may be any appropriate digital or analog display device capable of receiving display signals from the controller 50 and displaying a sensory perceptible output of the display signals. The display signals to the display device 72 may include payload weight signals with the estimated payload weight calculated by the controller 50 as set forth herein, and other display signals for information such as a number of loads of material deposited in a transport vehicle during a current loading cycle, an accumulated weight of material loaded into the transport vehicle, a target weight of the material needed to achieve a target payload for the transport vehicle, and other information helpful to the operator of the machine 10. In some implementations, the display device 72 may include a touch-sensitive screen capable of displaying the information in the display signals from the controller 50 while also allowing the operator to input commands at the display device 72 and generating corresponding machine control signals that may be transmitted from the display device 72 to the controller 50.

Figure 3:
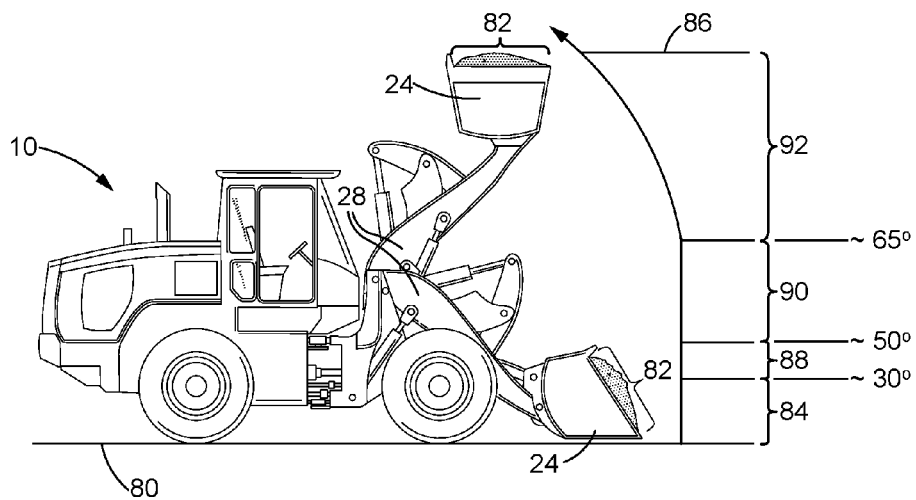
FIG. 3 is a side elevation view of the wheel loader machine of FIG. 1 with a lift arm and implement in a lowered position and a raised position and illustrating the motion of the lift arm and implement during a weighing operation.

FIG. 3 illustrates an exemplary weighing operation for the machine 10 where the payload weight estimate may be derived from the hydraulic pressure acting within the lift cylinder as well as the position of the lift arms 28. The weighing operation may begin with the lift arms 28 rotated downwardly so that the implement 24 is disposed proximate a work surface 80 at a lower lift limit with the implement 24 in a fully racked position. The machine 10 may be driven forward into a pile of work material (not shown) to accumulate a load 82 of the material in the implement 24. The operator may operate the control lever 46 to cause the lift cylinder 30 to extend and rotate the lift arms 28 to lift the implement 24 through a dig zone 84 and out of the pile of work material. The dig zone 84 may represent upward movement of the implement 24 to approximately 30% of an upper lift limit 86 of the machine 10.

Above the dig zone 84, it may be desirable to provide an acceleration zone 88 before the implement 24 enters a weigh range 90 where the payload weight of the load 82 of material will be estimated. The acceleration zone 88 is provided to allow the lift arms 28 to accelerate and then reach an approximately constant lift arm angular velocity $\omega_{LA}$ as the implement 24 moves through the weigh range 90 where the controller 50 may use a hydraulic pressure differential to estimate the payload weight. The acceleration zone 88 may range from approximately 30% to approximately 50% of the upper lift limit 86. The weigh range 90 may range from approximately 50% to approximately 65% of the upper lift limit 86, with an area between the end of the weigh range 90 and the upper lift limit 86 constituting a deceleration zone 92 to allow the lift arms 28 to decelerate outside the weigh range 90 before the implement 24 reaches the upper lift limit 86. The illustrated ranges for the zones 84, 88, 92 and the weigh range 90 may be general guidelines for the machine 10 and may be varied as appropriate in particular implementations to provide the most accurate estimates of the payload weight for the machine 10 and its operating conditions.

It is desirable to estimate the payload weight when the lift linkage 44 and the implement 24 are moving to eliminate static friction and other static forces in the lift linkage 44 that may affect the accuracy of the weight estimate. Ideally, the lift arm angular velocity $\omega_{LA}$ will be constant as the implement 24 moves through the weigh range 90 instead of accelerating or decelerating within the weigh range 90. Angular acceleration/deceleration of the lift arms 28 results in increased/decreased hydraulic pressure in the head end of the lift cylinder 30 that is transmitted as force to the lift arms 28 that is required to support the load 82 of material. Consequently, failure to move through the weigh range 90 with the lift arm angular velocity $\omega_{LA}$ being constant can result in inaccurate payload weight estimates and inefficient loading of the transport vehicle. Despite the provision of the acceleration zone 88 and the deceleration zone 92, and an operator's efforts to move the implement 24 through the weigh range 90 with the lift arm angular velocity $\omega_{LA}$ held constant, acceleration and/or deceleration through the weigh range 90, and their corresponding effect on the payload weight estimate, are inevitable.

Figure 4:
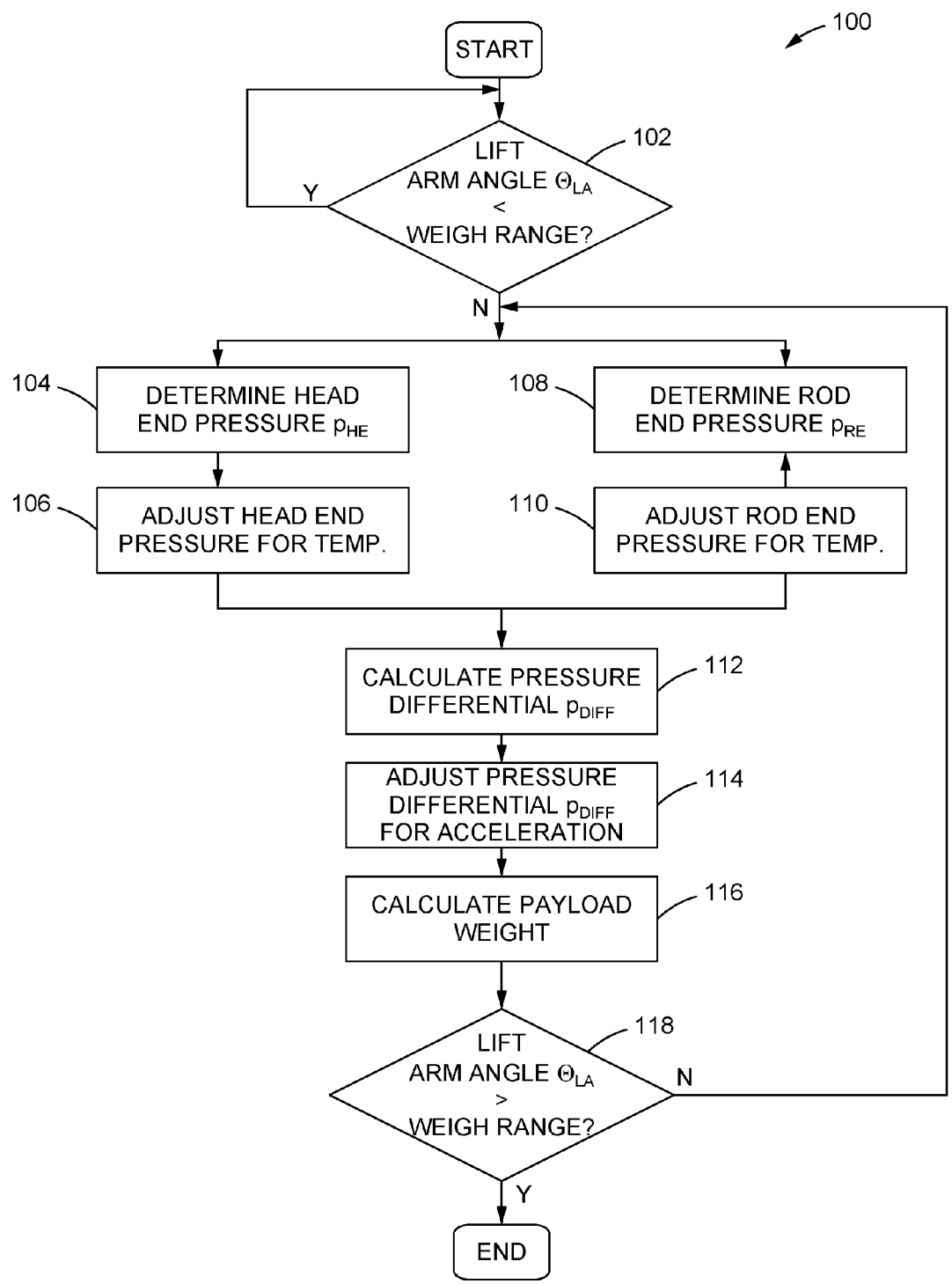
FIG. 4 is a block diagram of a payload weight measurement routine in accordance with the present disclosure that may be executed by the wheel loader machine of FIG. 1.

FIG. 4 illustrates an exemplary payload weight measurement routine 100 of a payload weight calculation system that may compensate for angular acceleration and deceleration of the lift arms 28 when estimating the payload weight. The controller 50 may be configured to continuously perform the routine 100 while the machine 10 is operational, or may only perform the routine 100 in response to a triggering event such as the operator inputting a command at an input device (not shown) to execute the routine 100, or the controller 50 detecting lift arm position sensor signals that cause lift cylinder control signals to be output to the lift cylinder actuator 70 to extend the lift cylinder 30 and raise the lift arms 28 and the implement 24. The routine 100 may begin at a block 102 where the controller 50 may evaluate the lift arm angle sensor signal to determine whether the lift arm angle $\theta_{LA}$ is less than a lower limit angle for the weigh range 90 and, consequently, the implement 24 is not within the weigh range 90. If the controller 50 determines that the lift arm angle $\theta_{LA}$ is less than the lower limit angle for the weigh range 90, control may pass back to the block 102 to reevaluate the lift arm angle sensor signal after a predetermined sampling period such as 10 msec.

If the controller 50 determines that the lift arm angle $\theta_{LA}$ is not less than the lower limit angle for the weigh range 90, the implement 24 is within the weigh range 90 and control may pass to a block 104 where the controller 50 may determine the head end pressure $p_{HE}$ within the head end of the lift cylinder 30 by receiving and processing the head end pressure sensor signals from the head end pressure sensor 64. After the head end pressure $p_{HE}$ is determined, control may pass to a block 106 where the controller 50 may adjust the head end pressure $p_{HE}$ based on the operating temperature proximate the head end pressure sensor 64. Pressure can vary with temperature according to the ideal gas law, and pressure drops may occur in hoses and other fluid conduits connecting the head end of the lift cylinder 30 to the location of the head end pressure sensor 64. The controller 50 may be configured to compensate for pressure variation due to temperature and pressure drops, and to calculate an adjusted head end pressure $p_{HE}$ at the block 106. As the controller 50 is determining the head end pressure $p_{HE}$ at the block 104 and adjusting the head end pressure $p_{HE}$ at the block 106, the controller 50 may in a similar fashion determine the rod end pressure $p_{RE}$ at the rod end of the lift cylinder 30 at a block 108, and adjust the rod end pressure $p_{RE}$ for temperature and pressure drops at a block 110 to derive an adjusted rod end pressure $p_{RE}$.

After the adjusted head end pressure $p_{HE}$ and the adjusted rod end pressure $p_{RE}$ are derived at the block 106 and the block 110, respectively, control may pass to a block 112 where the controller 50 may use the adjusted head end pressure $p_{HE}$ and the adjusted rod end pressure $p_{RE}$ to calculate a lift cylinder pressure differential $p_{DIFF}$. Due to the rod of the lift cylinder 30 occupying a portion of the surface area of the piston dividing the head end and rod end portions of the lift cylinder 30, the adjusted rod end pressure $p_{RE}$ acts on a smaller area than the adjusted head end pressure $p_{HE}$, and the pressures cannot merely be subtracted from each other to calculate the lift cylinder pressure differential $p_{DIFF}$. Consequently, the controller 50 may be programmed to compensate for the reduced area in the rod end. For example, in an exemplary configuration, the controller 50 may programmed to multiply the adjusted rod end pressure $p_{RE}$ by a ratio of the rod end cross-sectional area (piston cross-sectional area minus rod cross-sectional area) to the head end cross-sectional area (piston cross-sectional area), and then subtract the product from the adjusted head end pressure $p_{HE}$. Other calculations for compensating for the differing surface areas will be apparent to those skilled in the art.

Situations may occur where the rod end pressure $p_{RE}$ is not available to the controller 50 for determining the lift cylinder pressure differential $p_{DIFF}$. For example, the rod end pressure sensor 66 may malfunction and not transmit rod end pressure sensor signals. In other implementations as suggested above, the machine 10 may not have a rod end pressure sensor 66 to provide the rod end pressure sensor signals. To handle such situations, the controller 50 may determine an estimated lift cylinder pressure differential $p_{DIFF}$ without an actual value of the rod end pressure $p_{RE}$. The controller 50 may be programmed with a constant value to use in lieu of the actual rod end pressure $p_{RE}$, such as a standard atmospheric pressure of 101 kPa. If no rod end pressure sensor signal is detected, the controller 50 may bypass the blocks 108, 110, and may subtract the constant value of the rod end pressure $p_{RE}$ from the actual head end pressure $p_{HE}$ to determine an estimated lift cylinder pressure differential $p_{DIFF}$.

With the lift cylinder pressure differential $p_{DIFF}$ derived at the block 112, control may pass to a block 114 where the controller 50 is configured to use the lift arm angular acceleration $\alpha$, and kinematic properties of the lift linkage 44 and the load 82 of material, to adjust the lift cylinder pressure differential $p_{DIFF}$ by an angular acceleration compensation factor W to arrive at a compensated pressure differential $p_{COMP}$. Determination of the lift arm angular acceleration $\alpha$ and the angular acceleration compensation factor W is discussed more fully hereinafter. After the compensated pressure differential $p_{COMP}$ is determined at the block 114, control may pass back to a block 116 where the controller 50 may calculate the estimated payload weight from the compensated pressure differential $p_{COMP}$, the lift arm angle $\theta_{LA}$ and other kinematic properties of the lift linkage 44 and the implement 24. For example, the portion of the compensated pressure differential $p_{COMP}$ attributable to the components of the lift linkage 44 and the implement 24 for a given value of the lift arm angle $\theta_{LA}$ may be readily calculated from known kinematics formulas, or may be stored in a lookup table in the memory 54 and retrieved by the controller 50. The remaining portion of the compensated pressure differential $p_{COMP}$ may be attributable to the weight of the load 82 of material carried by the implement 24, and may be used along with the surface area of the piston of the lift cylinder 30, the lift arm angle $\theta_{LA}$, other kinematic properties of the lift linkage 44 and assumptions regarding the payload distance $r_P$ from the pivot pin A to calculate the estimated payload weight.

Once the estimated payload weight is calculated, control may pass to a block 118 where the controller 50 may again evaluate the lift arm angle sensor signal to determine whether the lift arm angle $\theta_{LA}$ is greater than an upper limit angle for the weigh range 90 and, consequently, the implement 24 has passed through the weigh range 90 and is in the deceleration zone 92. If the controller 50 determines that the lift arm angle $\theta_{LA}$ is not greater than the upper limit angle for the weigh range 90, control may pass back to the blocks 102, 106 to begin determining the estimated payload weight at the current lift arm angle $\theta_{LA}$ by measuring the head end pressure $p_{HE}$ and the rod end pressure $p_{RE}$, respectively. The payload weight estimate may be the product of an iterative process where the payload weight is estimated at multiple positions within the weigh range 90, and the payload weights are average to provide a more accurate payload weight estimate. If the controller 50 determines that the lift arm angle $\theta_{LA}$ is greater than the lower limit angle for the weigh range 90 at the block 118, the implement 24 is above the weigh range 90 and the routine 100 may terminate until the next occurrence of the implement 24 being raised through the weigh range 90 with a load 82 of material for determination of the estimated payload weight.

Figure 5:
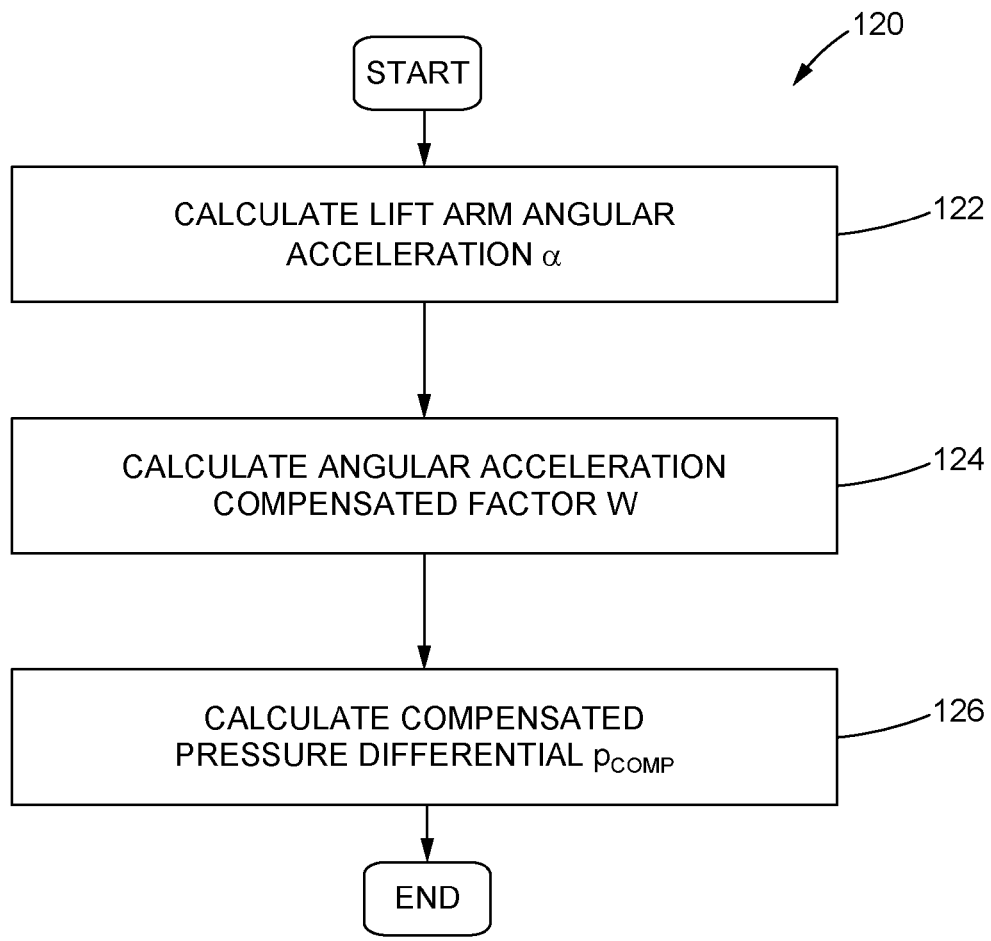
FIG. 5 is a block diagram of a pressure differential adjustment routine that may be executed by the wheel loader machine of FIG. 1 as part of the payload weight measurement routine of FIG. 4.

An exemplary strategy for adjustment of the lift cylinder pressure differential $p_{DIFF}$ performed at the block 114 of the routine 100 is provided in a pressure differential adjustment routine 120 illustrated in FIG. 5. The routine 120 may begin when control passes from the block 112 of the routine 100 to a block 122 where the controller 50 may determine the lift arm angular acceleration $\alpha$. In implementations where the machine 10 is equipped with the accelerometer 68, the controller 50 may determine the lift arm angular acceleration $\alpha$ directly from the accelerometer signal.

Where the machine 10 does not have the accelerometer 68, the lift arm angular acceleration $\alpha$ may be estimated at the block 122 using other sensor signals available to the controller 50. Various methods of estimating the lift arm angular acceleration α have benefits as well as limitations, so it may be advantageous to combine multiple methods to produce a more accurate estimate of the lift arm angular acceleration α. In one embodiment in accordance with the present disclosure, a linkage angle based angular acceleration $α_L$ utilizing the lift arm angle $θ_{LA}$ provided by the lift arm angle sensor signals may be combined with a valve command based angular acceleration $α_C$ utilizing the commanded fluid flow $C_{lift}$ for the lift cylinder actuator 70 to produce the estimated lift arm angular acceleration α.

The linkage angle based angular acceleration $α_L$ may be used because it may represent feedback of the actual lift arm angular acceleration α, and not just an open loop estimate. The linkage angle based angular acceleration $α_L$ calculation may be performed as a filtered double derivative of the lift arm angle $θ_{LA}$, which may be an extremely noisy operation due to high frequency noise being amplified each time a derivative is taken, and may require multiple filtering steps. In the calculation, a first derivative of the lift arm angle $θ_{LA}$ may be estimated by a known derivative method, such as by the backwards Euler formula, to yield an estimated lift arm angular velocity $ω_{LA}$. A second derivative may be taken of the estimated lift arm angular velocity $ω_{LA}$ by a similar method to yield the linkage angle based angular acceleration $α_L$.

The valve command based angular acceleration $α_C$ may be used because it is less noisy than the linkage angle based angular acceleration $α_L$, but it is predictive of the acceleration and not feedback of the actual lift arm angular acceleration α. Though not as accurate, the valve command based angular acceleration $α_C$ may supplement the linkage angle based angular acceleration $α_L$ to reduce the effect of noise in the final estimate. Because the commanded fluid flow $C_{lift}$ is used, the calculation of the valve command based angular acceleration $α_C$ may involve a delayed derivative of the commanded fluid flow $C_{lift}$ in order to approximate the actual system response of the lift cylinder actuator 70 and the lift cylinder 30 after the commanded fluid flow $C_{lift}$ is transmitted by the controller 50. The commanded fluid flow $C_{lift}$ may be used to determine a commanded cylinder velocity $v_{cyl}$ representing the velocity of the lift cylinder 30 extending or retracting in response to the commanded fluid flow $C_{lift}$. The commanded fluid flow $C_{lift}$ will produce a corresponding fluid flow rate $Q_{lift}$ of pressurized fluid into the head end of the lift cylinder 30. The fluid flow rate $Q_{lift}$ may be measured directly by a flow meter (not shown) transmitting a flow meter signal to the controller 50. Alternatively, the fluid flow rate $Q_{lift}$ may be determined indirectly by mapping values of the commanded fluid flow $C_{lift}$ to the expected fluid flow rates $Q_{lift}$, and storing the map in a table in the memory 54 for retrieval by the controller 50. With the estimated fluid flow rate $Q_{lift}$ retrieved from the table based on the commanded fluid flow $C_{lift}$, the controller 50 may calculate the commanded cylinder velocity $v_{cyl}$ using the fluid flow rate $Q_{lift}$ and known properties of the lift cylinder 30.

The commanded cylinder velocity $v_{cyl}$ must be converted to a commanded angular velocity $ω_{cyl}$ of the lift arms 28 resulting from the commanded cylinder velocity $v_{cyl}$. The conversion may be performed using a lift arm angular gain factor G representing a degree of rotation of the lift arms 28 per unit of lift cylinder extension. Due to the kinematics of the end frame 14, the lift arms 28, the lift cylinder 30 and the interconnecting pivot pins A, K and Y, the value of the lift arm angular gain factor G will vary with the lift arm angle $θ_L$. Similar to the commanded fluid flow $C_{lift}$ and the fluid flow rate $Q_{lift}$, a map of the possible values of the lift arm angle $θ_{LA}$ within the weigh range 90 to the corresponding values of the lift arm angular gain factor G may be stored in a table in the memory 54 for retrieval by the controller 50. After the controller 50 extracts the lift arm angular gain factor G from the memory 54 based on the lift arm angle $θ_{LA}$, the controller 50 may multiply the commanded cylinder velocity $v_{cyl}$ by the gain factor G to get the commanded angular velocity $θ_{cyl}$. If necessary, the units of the commanded angular velocity $θ_{cyl}$ may be converted from degrees per unit of time to radians per unit of time. A derivative of the commanded angular velocity $ω_{cyl}$ may be estimated by a known derivative method, such as by the backwards Euler formula used above, to yield the value command based angular acceleration $α_C$.

As discussed above, any estimated or actual value of the lift arm angular acceleration α may be used to adjust the lift cylinder pressure differential $p_{DIFF}$, but the estimated payload measurement in accordance with the present disclosure may combine the linkage angle based angular acceleration $α_L$ and the valve command based angular acceleration $α_C$. The estimated angular acceleration α may be a linear combination of the two separate estimated angular accelerations $α_L$ and $α_C$. The lift arm angular acceleration α may be calculated from an angular acceleration formula:

$$α = M*α_L + (1-M)*α_C \quad (1)$$

M is an acceleration gain factor used to weight the tradeoff between the linkage angle based angular acceleration $α_L$ and the valve command based angular acceleration $α_C$. The acceleration gain factor M will have a dimensionless value between 0 and 1 so that the coefficients in Equation (1) sum to 1 and the result is the full estimate of the lift arm angular acceleration α. The acceleration gain factor M may be chosen as desired to reduce the influence of the noise in the estimation of the linkage angle based angular acceleration $α_L$ to an acceptable level.

Once the lift arm angular acceleration α is estimated by the controller 50 using any of the above methods or other appropriate methods and the block 122, control may pass to a block 124 to calculate the angular acceleration compensation factor W. As a general proposition, the angular acceleration compensation factor W may be function of the lift arm angular acceleration α of the linkage of the machine 10 raising the implement 24 and load 82 of material, a kinematically relevant angle θ of the linkage, and the overall kinematics of the linkage. In the following, an equation for the angular acceleration compensation factor W is derived for the lift linkage 44 of the machine 10 as shown in FIG. 1.

The derivation of the angular acceleration compensation factor W begins by considering the lift linkage 44, and the implement 24 and the load 82 of material, as two discrete members. The properties of the implement 24 may vary from machine-to-machine and from implement-to-implement that may be attached at the coupler 26, so it may be useful to separate the unknown implement properties from the known properties of the lift linkage 44. Equations for the sum of torque τ about the pivot pin A may be derived using the payload distance $r_P$ from the pivot pin A to the center of mass of the implement 24 and the load 82, the linkage distance $r_L$ from the pivot pin A to the center of mass of the lift linkage 44, the payload angle $θ_P$ and the linkage angle payload angle $θ_L$. A first equation represents a torque $τ_0$ assuming zero lift arm angular acceleration α about the pivot pin A:

$$\tau_0 = C(\theta)*p_0 = m_P r_P g \cos\theta_P + m_L r_L g \cos\theta_L \quad (2)$$

C(θ) is a function of an angle θ yielding a value that is multiplied by a lift cylinder pressure differential p to give a torque τ applied by the lift cylinder 30 about the pivot pin A in the counterclockwise direction as seen in FIG. 1, the lift cylinder pressure differential $p_0$ is the head end pressure $p_{HE}$ when the lift arm angular acceleration α is equal to 0, and g is the acceleration due to gravity. The first torque factor on the right side of the equation is a payload torque rip applied by the implement 24 and the load 82 about the pivot pin A in the clockwise direction as seen in FIG. 1, and the second torque factor is a lift linkage torque $T_L$ applied by the lift linkage 44 about the pivot pin A in the clockwise direction as seen in FIG. 1.

A second equation represents a torque $T_{actual}$ assuming a non-zero acceleration α about the pivot pin A:

$$\tau_{actual} = C(\theta)*p_{actual} = I_P\alpha + m_P r_P g \cos\theta_P + I_L\alpha + m_L r_L g \cos\theta_L \quad (3)$$

$I_P$ is the moment of inertia of the implement 24 and the load 82 about the pivot pin A, $I_L$ is the moment of inertia of the lift linkage 44 about the pivot pin A, $I_P\alpha$ is a torque due to acceleration applied by the implement 24 and the load 82 about the pivot pin A in the clockwise direction as seen in FIG. 1, and $I_L\alpha$ is a torque due to acceleration applied by the lift linkage 44 about the pivot pin A in the clockwise direction as seen in FIG. 1.

The angular acceleration compensation factor W is a value by which the torque $\tau_{actual}$ with acceleration of Equation (3) maybe be multiplied to yield the torque $\tau_0$ without acceleration of Equation (2) as follows:

$$W*C(\theta)*p_{actual} = C(\theta)*p_0 \quad (4)$$

The function C(θ) on both sides cancels out, and Equation (4) can be solved for the angular acceleration compensation factor W:

$$W = \frac{m_P r_P g \cos\theta_P + m_L r_L g \cos\theta_L}{I_P\alpha + m_P r_P g \cos\theta_P + I_L\alpha + m_L r_L g \cos\theta_L} \quad (5)$$

The angular acceleration compensation factor W could be calculated for each particular configuration of the lift linkage 44 in machines 10 of different sizes and from different manufactures having variations on the Z-bar linkage shown herein. However, assumptions can be made to simplify Equation (5) and yield an equation for the angular acceleration compensation factor W having application across sizes and manufacturers of wheel loader machines 10. First, it may be assumed that the payload angle $\theta_P$ is approximately equal to the linkage angle $\theta_L$. Second, assumptions can be made regarding the natures of the moments of inertia for the implement 24 and the load 82, and for the lift linkage 44. The payload moment of inertia $I_P$ can be modeled as a point mass:

$$I_P \approx m_P p_P^2 \quad (6)$$

The lift linkage moment of inertia $I_L$ can be modeled as a rod rotated about its end point:

$$I_L \approx \frac{m_L p_L^2}{3} + m_L p_L^2 = \frac{4 m_L p_L^2}{3} \quad (7)$$

Additionally, the linkage distance $r_L$ can be assumed to be approximately half the payload distance $r_P$. Using these assumptions, Equation (5) can be simplified:

$$W \approx \frac{1}{1 + \frac{\alpha r_P * \left(m_P + \frac{m_L}{3}\right)}{g\cos\theta * \left(m_P + \frac{m_L}{2}\right)}} \quad (8)$$

A final assumption may provide a significant simplification of Equation (8). Within a range of expected implements 24 and loads 82 of material carried by the implements 24, the effects of the weight distribution between the lift linkage 44, the implement 24 and the load 82 may be approximated with an acceleration compensation gain K:

$$[m_{min} \leq m_P \leq m_{max}] \rightarrow K \approx \frac{m_P + \frac{m_L}{3}}{m_P + \frac{m_L}{2}} \quad (9)$$

$m_{min}$ is approximately 0 to represent an empty implement 24, and $m_{max}$ is a mass of a maximum rated payload for the machine 10. As will be apparent from Equation (9), the acceleration compensation gain K has dimensionless value that is less than or equal to 1. Using the acceleration compensation gain K, Equation (8) becomes an angular acceleration compensation factor formula:

$$W \approx \frac{1}{1 + \frac{K\alpha r_P}{g\cos\theta}} \quad (10)$$

Equation (10) may be stored in the memory 54 along with an appropriate value of the acceleration compensation gain K for the machine 10 and the payload distance $r_P$. When control passes to the block 124, the controller 50 may use the stored acceleration compensation gain K and the payload distance $r_P$, along with the lift arm angular acceleration α estimated at the block 122 and the lift arm angle $\theta_{LA}$ from the lift arm angle sensor signal to solve Equation (10) for the angular acceleration compensation factor W. With the angular acceleration compensation factor W calculated at the block 124, control may pass to a block 126 where the controller 50 may multiply the lift cylinder pressure differential $p_{DIFF}$ by the angular acceleration compensation factor W to arrive at a final compensated differential pressure $p_{COMP}$ that can be used for calculating the payload weight at the block 116 of the routine 100.

INDUSTRIAL APPLICABILITY

The payload weight measurement routine 100 and the pressure differential adjustment routine 120 in accordance with the present disclosure compensate for the effects of the lift arm angular acceleration α in estimating the payload weight of the load 82 of material in the implement 24 to provide the operator with more accurate information on the progress of filling a transport vehicle or the performance of other operations. The calculations are simplified using assumptions about the kinematics of the machine 10 in which the routines 100, 120 are implemented, and utilize information already available at the machine 10, such as the lift arm angle $\theta_{LA}$ and the commanded fluid flow $C_{lift}$ transmitted to the lift cylinder actuator 70. Because additional hardware is not required, the routines 100, 120 may be implemented in existing machines 10 through a software upgrade installed in the memory 54 of the controller 50.

In addition to relative ease in installation, the routines 100, 120 provide flexibility in their implementation by allowing for the use of any calculation(s) of the lift arm angular acceleration α that are most relevant and reliable for a machine 10 and its configuration. Direct measurement of the lift arm angular acceleration α may be utilized where the machine 10 has the accelerometer 68 installed and in communication with the controller 50. The linkage angle based angular acceleration $\alpha_L$ and/or the valve command based angular acceleration $\alpha_C$ may be utilized for indirect estimates of the lift arm angular acceleration α and combined in a manner reflecting the benefits and the limitations of the individual estimates. Other strategies for determining the lift arm angular acceleration α using the available information for the machine 10 may also be considered and implemented in the routines 100, 120, and such alternatives are contemplated by the inventors.

The value of the acceleration compensation gain K is based on the kinematics of the machine 10 in which the routines 100, 120 are implemented and assumptions about the kinematics that simplify the determination of the acceleration compensation gain K. For wheel loaders such as the machine 10 illustrated and described herein, regression analysis of data for various loads 82 of material carried by wheel loaders indicates that a value of the acceleration compensation gain K equal to approximately 0.7 yields accurate estimates of the payload weight using Equation (10) in the routines 100, 120. This value of the acceleration compensation gain K reflects and accounts for the assumptions made to simplify Equation (5) to Equations (9) and (10). Other assumptions may have yielded a different equation for the acceleration compensation gain K than that expressed in Equation (9). For example, different assumptions regarding the relationships between the angles $\theta_P$, $\theta_L$ and the distances $r_P$, $r_L$, and the nature of the payload moment of inertia $I_P$ and the lift linkage moment of inertia $I_L$ that may change the Equations (6) and (7) and, correspondingly, Equation (9), may result in values other than 0.7 being applicable for the acceleration compensation gain K.

As previously discussed, the payload weight estimation strategy compensating for the effects of lift arm angular acceleration α may be applied to machines other than wheel loaders as illustrated herein, such as excavators, backhoes and other machines capable of accumulating a load of material in an implement and transferring the load to another location such as a transport vehicle. It is also desirable in these other machines to determine an accurate estimate of the payload weight of the material carried by the implement, and the estimate may be performed when the implement and supporting linkage are moving. Instead of lift arms 28 and a Z-bar linkage as illustrated herein, excavators and backhoes have booms and sticks as the kinematic elements connecting the implement to the frame of the machine and to manipulate the implement to accumulate and move the load of material. The differing kinematics and different assumptions may yield variations in Equations (2)-(10) set forth above, but a value for the acceleration compensation gain K and an equation for the angular acceleration compensation W can be derived in a similar manner as described above that will yield an accurate estimate of the payload weight of a load carried by the implement. Such analysis is equally applicable in other machines having other kinematic relationships.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:
1. A machine comprising:
an end frame;
a lift arm pivotally connected to the end frame and having a lift arm angle that is equal to an angle between a horizontal line and a lift arm longitudinal axis;
an implement pivotally connected to the lift arm;
a lift cylinder having a lift cylinder head end pivotally connected to the end frame and a lift cylinder rod end pivotally connected to the lift arm;
a lift cylinder actuator operatively coupled to the lift cylinder to provide pressurized fluid flow to the lift cylinder to cause the lift cylinder to extend and retract to correspondingly cause the lift arm to rotate to raise and lower the implement;
a control lever position sensor operatively connected to a control lever to sense a displacement of the control lever and output a control lever position sensor signal that corresponds to the displacement of the control lever;
a lift arm angle sensor operatively connected to the lift arm to sense the lift arm angle of the lift arm and output a lift arm angle sensor signal that corresponds to the lift arm angle;
a head end pressure sensor operatively connected to the lift cylinder to sense a head end pressure of the lift cylinder and output a head end pressure sensor signal that corresponds to the head end pressure;
a display device; and
a controller operatively connected to the lift cylinder actuator, the control lever position sensor, the lift arm angle sensor, the head end pressure sensor, and the display device, wherein:
the controller is configured to detect the control lever position sensor signal and to transmit a lift cylinder control signal to cause the lift cylinder actuator to create fluid flow to cause the lift cylinder to extend in response to receiving the control lever position sensor signal, the controller is configured to determine a lift cylinder pressure differential based on the head end pressure from the head end pressure sensor signal in response to determining that the lift arm angle in the lift arm angle sensor signal is within a weigh range of the lift arm, the controller is configured to determine a lift arm angular acceleration in response to determining that the lift arm angle in the lift arm angle sensor signal is within the weigh range of the lift arm, the controller is configured to determine an angular acceleration compensation factor based on the lift arm angular acceleration, the controller is configured to determine a compensated pressure differential by multiplying the lift cylinder pressure differential by the angular acceleration compensation factor, the controller is configured to determine a payload weight of a load of material in the implement based on the compensated pressure differential and a head end cross-sectional area of the lift cylinder, the controller is configured to transmit payload weight signals to the display device to display the payload weight to an operator of the machine, and wherein the controller being configured to determine the lift arm angular acceleration comprises the controller being configured to determine a valve command based angular acceleration based on a commanded fluid flow transmitted from the controller to the lift cylinder actuator in the lift cylinder control signal.

2. The machine of claim 1, comprising an accelerometer operatively connected to the lift arm to sense the lift arm angular acceleration and output an accelerometer signal that corresponds to the lift arm angular acceleration, wherein the controller is configured to determine the lift arm angular acceleration based on the accelerometer signal received from the accelerometer.

3. The machine of claim 1, wherein the controller being configured to determine the lift arm angular acceleration comprises the controller being configured to determine a linkage angle based angular acceleration based on changes in the lift arm angle in the lift arm angle sensor signal over time as the lift arm angle sensor signal indicates that the lift arm angle is within the weigh range of the lift arm.

4. The machine of claim 3, wherein the controller being configured to determine the lift arm angular acceleration comprises the controller being configured to calculate the lift arm angular acceleration according to an angular acceleration formula:

$$\alpha = M^* \alpha_L + (1-M)^* \alpha_c$$

where $\alpha$ is the lift arm angular acceleration, M is an acceleration gain factor having a dimensionless value from 0 to 1, $\alpha_L$ is the linkage angle based angular acceleration and $\alpha_c$ is the valve command based angular acceleration.

5. The machine of claim 1, wherein the controller being configured to determine the angular acceleration compensation factor comprises the controller being configured to calculate the angular acceleration compensation factor according to an angular acceleration compensation factor formula:

$$W = \frac{1}{1 + \frac{K \alpha r_P}{g \cos \theta}}$$

where W is the angular acceleration compensation factor that is dimensionless, K is an acceleration compensation gain that is dimensionless, a is the lift arm angular acceleration, $r_p$ is a payload distance from a pivot pin pivotally connecting the lift arm to the end frame to a center of mass of the load of material and the implement, g is acceleration due to gravity, and $\theta$ is the lift arm angle of the lift arm.

6. The machine of claim 5, wherein the acceleration compensation gain K is equal to approximately 0.7.

7. A method for determining a payload weight of a load of material carried by an implement of a machine, comprising:

raising the implement through a weigh range between a lower lift limit and an upper lift limit of the implement;

determining, at a controller of the machine, a lift cylinder pressure differential in a lift cylinder of the machine based on a head end pressure of the lift cylinder;

determining, at the controller, a lift arm angular acceleration of a lift arm of the machine raising the implement through the weigh range;

determining, at the controller, an angular acceleration compensation factor based on the lift arm angular acceleration;

determining, at the controller, a compensated pressure differential by multiplying the lift cylinder pressure differential by the angular acceleration compensation factor;

determining, at the controller, the payload weight of the load of material based on the compensated pressure differential and a head end cross-sectional area of the lift cylinder, wherein determining the lift arm angular acceleration comprises determining, at the controller, a valve command based angular acceleration based on a commanded fluid flow transmitted from the controller to a lift cylinder actuator in response to a control lever position sensor signal causing the implement to be raised through the weigh range.

8. The method for determining a payload weight of claim 7, wherein determining the lift arm angular acceleration comprises:

receiving, at the controller, an accelerometer signal from an accelerometer operatively connected to the lift arm; and converting, at the controller, the accelerometer signal to the lift arm angular acceleration.

9. The method for determining a payload weight of claim 7, wherein determining the lift arm angular acceleration comprises determining, at the controller, a linkage angle based angular acceleration based on changes in a lift arm angle of the lift arm over time as the lift arm moves through the weigh range.

10. The method for determining a payload weight of claim 9, wherein determining the lift arm angular acceleration comprises calculating, at the controller, the lift arm angular acceleration according to an angular acceleration formula:

$$\alpha = M^* \alpha_L + (1-M)^* \alpha_C$$

where $\alpha$ is the lift arm angular acceleration, M is an acceleration gain factor having a dimensionless value from 0 to 1, $\alpha_L$ is the linkage angle based angular acceleration and $\alpha_c$ is the valve command based angular acceleration.

11. The method for determining a payload weight of claim 7, wherein determining the angular acceleration compensation factor comprises calculating, at the controller, the angular acceleration compensation factor according to an angular acceleration compensation factor formula:

$$W = \frac{1}{1 + \frac{K\alpha r_P}{g\cos\theta}}$$

where W is the angular acceleration compensation factor that is dimensionless, K is an acceleration compensation gain that is dimensionless, $\alpha$ is the lift arm angular acceleration, $r_p$ is a payload distance from a pivot pin pivotally connecting the lift arm to the machine to a center of mass of the load of material and the implement, g is acceleration due to gravity, and $\theta$ is a lift arm angle of the lift arm relative a horizontal line.

12. The method for determining a payload weight of claim 11, wherein the acceleration compensation gain K is equal to approximately 0.7.

13. A payload weight calculation system for determining a payload weight of a load of material carried by an implement of a machine, comprising:
   a lift arm angle sensor configured to sense a lift arm angle of a lift arm of the machine and output a lift arm angle sensor signal that corresponds to the lift arm angle;
   a head end pressure sensor configured to sense a head end pressure of a lift cylinder connected to the lift arm and output a head end pressure sensor signal that corresponds to the head end pressure; and
   a controller configured to:
      determine a lift cylinder pressure differential based on the head end pressure from the head end pressure sensor signal in response to the lift arm rotating upwardly and determining that the lift arm angle in the lift arm angle sensor signal is within a weigh range of the lift arm,
      determine a lift arm angular acceleration in response to determining that the lift arm angle in the lift arm angle sensor signal is within the weigh range of the lift arm,
      determine an angular acceleration compensation factor based on the lift arm angular acceleration,
      determine a compensated pressure differential by multiplying the lift cylinder pressure differential by the angular acceleration compensation factor, and
      determine the payload weight of the load of material in the implement based on the compensated pressure differential and a head end cross-sectional area of the lift cylinder,
      wherein the controller being configured to determine the lift arm angular acceleration comprises the controller being configured to determine a valve command based angular acceleration based on a commanded fluid flow transmitted from the controller to a lift cylinder actuator in a lift cylinder control signal to extend the lift cylinder and rotate the lift cylinder upwardly.

14. The payload weight calculation system of claim 13, wherein the controller being configured to determine the lift arm angular acceleration comprises the controller being configured to determine a linkage angle based angular acceleration based on changes in the lift arm angle in the lift arm angle sensor signal over time as the lift arm angle sensor signal indicates that the lift arm angle is within the weigh range of the lift arm.

15. The payload weight calculation system of claim 14, wherein the controller being configured to determine the lift arm angular acceleration comprises the controller being configured to calculate the lift arm angular acceleration according to an angular acceleration formula:

$$\alpha = M*\alpha_L + (1-M)*\alpha_c$$

where $\alpha$ is the lift arm angular acceleration, M is an acceleration gain factor having a dimensionless value from 0 to 1, $\alpha_L$ is the linkage angle based angular acceleration and $\alpha_c$ is the valve command based angular acceleration.

16. The payload weight calculation system of claim 13, wherein the controller being configured to determine the angular acceleration compensation factor comprises the controller being configured to calculate the angular acceleration compensation factor according to an angular acceleration compensation factor formula:

$$W = \frac{1}{1 + \frac{K\alpha r_P}{g\cos\theta}}$$

where W is the angular acceleration compensation factor that is dimensionless, K is an acceleration compensation gain that is dimensionless, $\alpha$ is the lift arm angular acceleration, $r_p$ is a payload distance from a pivot pin pivotally connecting the lift arm to an end frame of the machine to a center of mass of the load of material and the implement, g is acceleration due to gravity, and $\theta$ is the lift arm angle of the lift arm.

17. The payload weight calculation system of claim 16, wherein the acceleration compensation gain K is equal to approximately 0.7.

* * * * *